(12) United States Patent
Allen

(10) Patent No.: US 8,651,527 B1
(45) Date of Patent: Feb. 18, 2014

(54) DOUBLE WALL DOME SEAL FOR A VEHICLE

(71) Applicant: GM Global Technology Operations LLC, Detroit, MI (US)

(72) Inventor: Todd E. Allen, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/706,392

(22) Filed: Dec. 6, 2012

(51) Int. Cl.
*B62D 1/16* (2006.01)

(52) U.S. Cl.
USPC .......................................... 280/779; 277/634

(58) Field of Classification Search
USPC ............... 280/779; 403/50, 51; 277/634–637, 277/640, 641; 464/173
See application file for complete search history.

(56) References Cited

U.S. PATENT DOCUMENTS

| | | | | |
|---|---|---|---|---|
| 5,145,191 A | * | 9/1992 | Stewart et al. | 277/636 |
| 5,161,651 A | * | 11/1992 | Weiler et al. | 277/636 |
| 5,176,576 A | * | 1/1993 | Moulindt | 464/111 |
| 5,941,123 A | * | 8/1999 | Numakami | 74/18.1 |
| 6,056,297 A | * | 5/2000 | Harkrader et al. | 277/634 |
| 6,328,315 B1 | * | 12/2001 | Hebenstreit | 277/634 |
| 7,086,952 B2 | * | 8/2006 | Wehner | 464/175 |
| 7,407,442 B2 | * | 8/2008 | Terashima | 464/173 |
| 7,832,765 B2 | * | 11/2010 | Park | 464/173 |
| 7,878,544 B2 | * | 2/2011 | Arce et al. | 280/779 |
| 2004/0256849 A1 | * | 12/2004 | Suzuki et al. | 280/779 |
| 2006/0108782 A1 | * | 5/2006 | Kanazawa et al. | 280/779 |
| 2008/0231003 A1 | * | 9/2008 | Moriyama et al. | 277/636 |

* cited by examiner

*Primary Examiner* — Paul N Dickson
*Assistant Examiner* — Robert A Coker
(74) *Attorney, Agent, or Firm* — Quinn Law Group, PLLC

(57) ABSTRACT

A double wall dome seal seals between a steering gear and a dash panel of a vehicle. The dome seal includes a cover portion, a base portion, and a collapsible seal. The cover portion surrounds an axis and seals against the dash panel. The cover portion defines a first opening. The base portion surrounds axis and seals against the steering gear. The base portion defines a second opening. The collapsible seal surrounds the axis and is disposed between the cover portion and the base portion. The collapsible seal defines a cavity which opens between the first opening and the second opening such that the axis extends through each of the first opening, the cavity, and the second opening. The collapsible seal deforms between an extended position and a collapsed position.

20 Claims, 2 Drawing Sheets

US 8,651,527 B1

DOUBLE WALL DOME SEAL FOR A VEHICLE

TECHNICAL FIELD

The present disclosure generally relates to a double wall dome seal for a vehicle.

BACKGROUND

A motor vehicle typically includes a dash panel, or bulkhead, that separates the passenger compartment from an engine compartment. A steering shaft passes through a hole in the dash panel to connect the steering wheel, which is in the passenger compartment, to the steering gear, which is in the engine compartment. A seal is typically employed between the dash panel and the shaft to prevent noise, gases, water, and debris from entering the passenger compartment from the engine compartment via the hole in the dash panel.

SUMMARY

A double wall dome seal is configured for sealing between a steering gear and a dash panel of a vehicle. The double wall dome seal includes a cover portion, a base portion, and a collapsible seal. The cover portion surrounds an axis and is configured for sealing against the dash panel. The cover portion defines a first opening. The collapsible seal operatively extends from the cover portion and surrounds the axis. The base portion operatively extends from the collapsible seal and surrounds the axis. The base portion is configured for sealing against the steering gear and defines a second opening. The collapsible seal defines a cavity which opens between the first opening and the second opening such that the steering axis extends through each of the first opening, the cavity, and the second opening. The collapsible seal is configured to deform along the axis between an extended position and a collapsed position. The cover portion is in spaced relationship to the base portion when the collapsible seal is in the extended position. Likewise, the cover portion is in sealing contact with the base portion when the collapsible seal is in the collapsed position.

A vehicle includes a dash panel, a steering gear, and a double wall dome seal. The dash panel defines a through hole. The steering gear includes a steering shaft and a steering collar surrounding the steering shaft. The steering shaft and the steering collar extend along an axis. The double wall dome seal is disposed in sealing engagement between the dash panel and the steering gear. The double wall dome seal includes a cover portion, a base portion, and a collapsible seal. The cover portion surrounds the axis and seals against the dash panel. The cover portion defines a first opening. A collapsible seal operatively extends from the cover portion and surrounds the axis. The base portion operatively extends from the collapsible seal and surrounds the steering shaft such that the collapsible seal is axially disposed between the cover portion and the base portion. The base portion defines a second opening and seals against the steering gear. The collapsible seal surrounds the axis and is disposed between the cover portion and the base portion. The collapsible seal defines a cavity which opens between the first opening and the second opening such that the steering shaft extends through each of the first opening, the cavity, and the second opening. The collapsible seal is configured to deform along the steering axis between an extended position and a collapsed position. The cover portion is in sealing contact with the base portion when the collapsible seal is in the collapsed position.

The above features and advantages and other features and advantages of the present invention will be readily apparent from the following detailed description of the preferred embodiments and best modes for carrying out the present invention when taken in connection with the accompanying drawings and appended claims.

DETAILED DESCRIPTION

Figure 1:
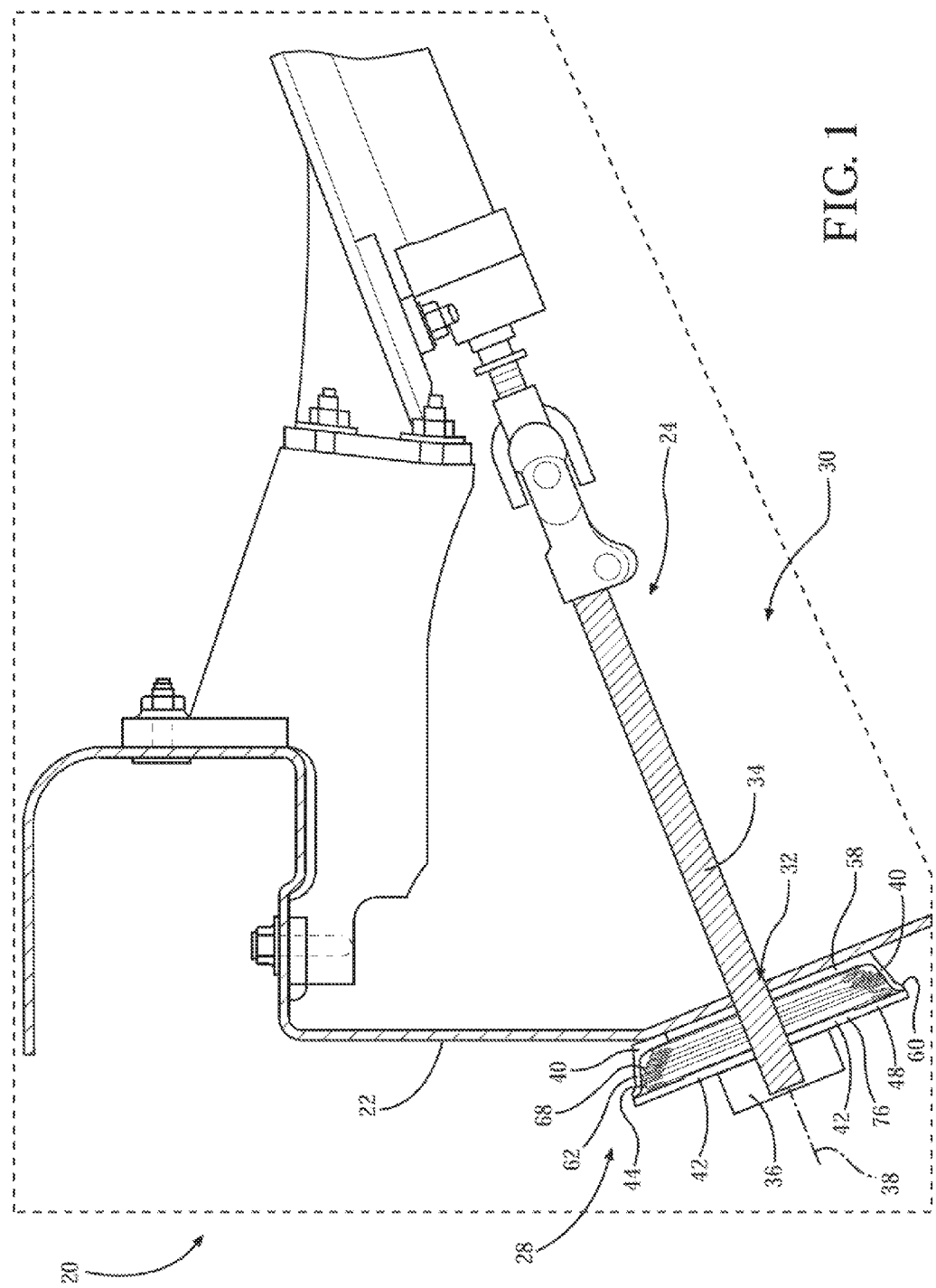
FIG. 1 is a schematic side fragmentary illustration of a double wall dome seal attached between a steering gear and a dash panel of a vehicle.

Referring to the Figures, wherein like numerals indicate corresponding parts throughout the several views, a vehicle 20 is shown at in FIG. 1. The vehicle 20 includes a dash panel 22, a steering assembly 24, and a double wall dome seal 26.

The dash panel 22 provides a barrier between an engine compartment 28 and a passenger compartment 30 of the vehicle 20. The dash panel 22 defines a through hole 32.

The steering assembly 24 includes a steering column 34 and a steering gear 36. The steering column 34 extends along an axis 38. The steering column 34 is operatively connected between the steering gear 36 and a steering wheel (not shown). The steering column 34 extends through the through hole 32 such that the steering column 34 extends into each of the engine compartment 28 and the passenger compartment 30. The steering gear 36 is operatively disposed in the engine compartment 28. The steering column 34 transmits rotation of the steering wheel to the steering gear 36 which, in turn, causes front wheels (not shown) of the vehicle 20 to turn to steer the vehicle 20 in a desired direction.

The double wall dome seal 26 is disposed in sealing engagement between the dash panel 22 and the steering gear 36. The double wall dome seal 26 is configured to provide an air tight seal between the engine compartment 28 and the passenger compartment 30, at the through hole 32. The double wall dome seal 26 includes a cover portion 40, a base portion 42, and a collapsible seal 44. The cover portion 40 surrounds the axis 38 and seals against the dash panel 22. The cover portion 40 defines a first opening 46. The base portion 42 includes a plate 48 defining a second opening 50. The base portion 42 surrounds the steering column 34 and seals against the steering gear 36.

Figure 2:
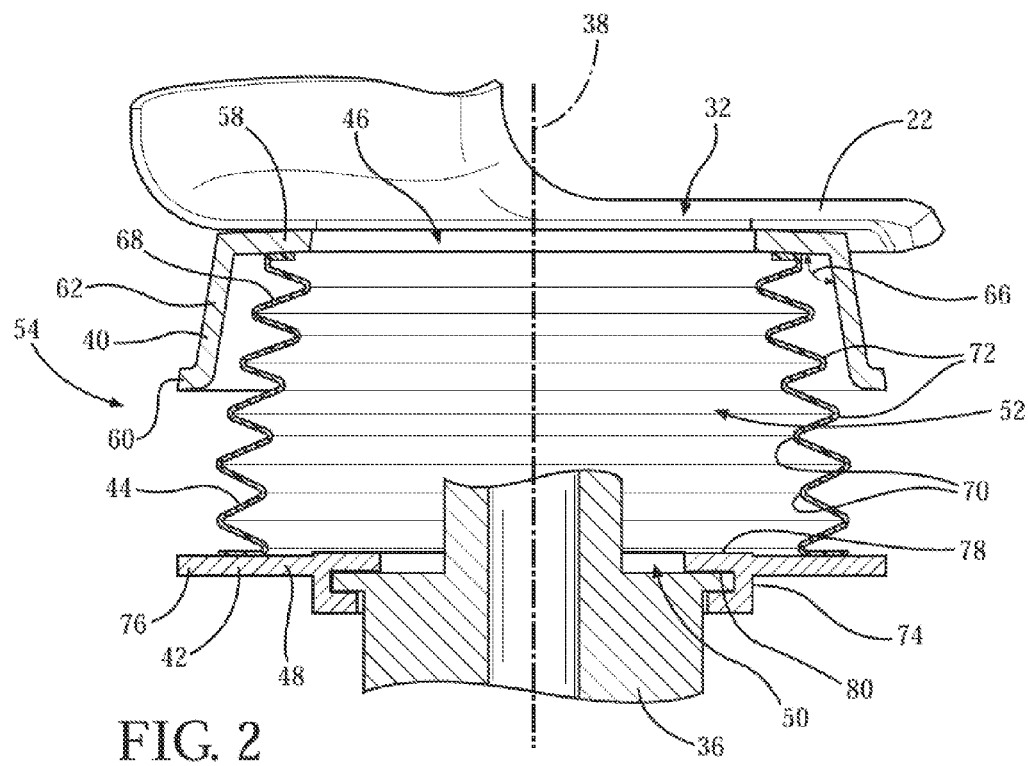
FIG. 2 is a schematic cross-sectional side view of the double wall dome seal in an extended position.
Figure 3:
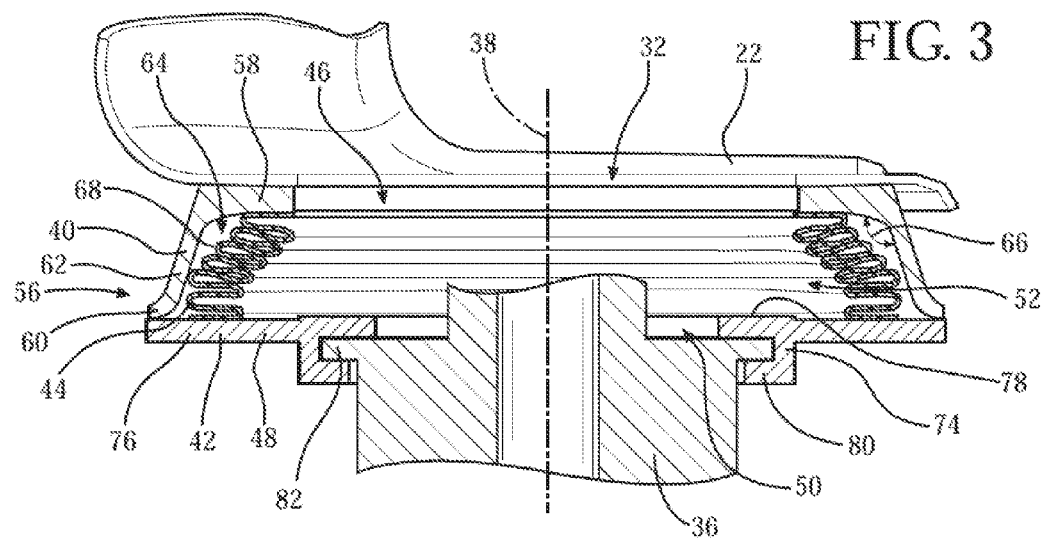
FIG. 3 is a schematic cross-sectional side view of the double wall dome seal in a collapsed position.

The collapsible seal 44 operatively extends from the base portion 42. The collapsible seal 44 surrounds the axis 38 and is disposed between the cover portion 40 and the base portion 42. The collapsible seal 44 defines a cavity 52 which opens between the first opening 46 and the second opening 50 such that the steering column 34 extends respectively through each of the first opening 46, the cavity 52, and the second opening 50. The collapsible seal 44 is deformable along the axis 38, relative to the steering column 34, between an extended position 54, as shown in FIG. 2, and a collapsed position 56, as shown in FIG. 3. Accordingly, the cover portion 40 radially surrounds a portion of the collapsible seal 44 when the collapsible seal 44 is in the extended position 54. Likewise, the cover portion 40 radially surrounds all of the collapsible seal 44 when the collapsible seal 44 is in the collapsed position 56.

As shown in FIG. 3, the cover portion 40 is in sealing contact with the base portion 42 when the collapsible seal 44 is in the collapsed position 56. The cover portion 40 includes a rim 58, a lip 60, and a first wall 62. The rim 58 defines the first opening 46. The lip 60 is configured for sealing against the base portion 42 when the collapsible seal 44 is in the collapsed position 56 to prevent fluid and/or air from passing into the passenger compartment 30 from the engine compartment 28. As such, the first wall 62 and the lip 60 radially surround all of the collapsible seal 44 Likewise, the lip 60 is in spaced relationship to the base portion 42 when the collapsible seal 44 is in the extended position 54. Therefore, the first wall 62 and the lip 60 radially surround only a portion of the collapsible seal 44. The first wall 62 interconnects the rim 58 and the lip 60. The rim 58, the lip 60, the first wall 62, the collapsible seal 44, and the base portion 42 cooperate to define a sealing chamber 64 therebetween when the collapsible seal 44 is in the collapsed position 56. The sealing chamber 64 creates a dead air space which helps to reduce the transmission of sound from the engine compartment 28 through the through hole 32 and into the passenger compartment 30.

The first wall 62 extends from the rim 58 at an angle 66 which is obtuse. The cover portion 40 is a resilient member. The resiliency allows the first wall 62 to flex relative to the rim 58, as the lip 60 seals against the base portion 42, such that the angle 66 is greater when the lip 60 of the cover portion 40 seals against the plate 48 of the base portion 42 than when the lip 60 of the cover portion 40 is in spaced relationship to the plate 48 of the base portion 42. The resilient member may include an elastomeric material. The elastomeric material may include any material capable of absorbing vibration, while still resisting relative movement, such as but not limited to a rubber material or the like.

The collapsible seal 44 includes a second wall 68 surrounding the axis 38 to define the cavity 52. More specifically, the second wall 68 surrounds the first wall 62 of the collapsible seal 44. The second wall 68 is in abutting relationship to the rim 58 and the base portion 42. The second wall 68 may be secured to the rim 58 and the base portion 42 via an adhesive, a weld, or any other mechanical bond such that the second wall 68 forms a seal between each of the rim 58 and the base portion 42. The second wall 68 includes a plurality of inner annular rims 70 and a plurality of outer annular rims 72, each surrounding the axis 38. The inner and outer annular rims 70, 72 are disposed in alternating relationship to one another along the axis 38 such that the collapsible seal 44 is undulated in the direction of the axis 38. More specifically, the collapsible seal 44 may be generally accordion shaped. The collapsible seal 44 is a resilient member. As such, as the collapsible seal 44 deforms from the extended position 54 to the collapsed position 56, the inner and outer annular rims 70, 72 axially move toward one another to collapse the collapsible seal 44. The resilient member may include a thermoplastic material. More specifically, the thermoplastic material may be formed from polyethylene terephthalate (PET), polyester, and the like.

The base portion 42 includes an engagement portion 74 and a plate portion 76 radially surrounding the engagement portion 74. The base portion 42 is sufficiently rigid such that the base portion 42 does not yield when axial forces are applied by the lip 60 of the cover portion 40 when the collapsible seal 44 is in the collapsed position 56. The base portion 42 includes a reinforced polymer. The reinforced polymer may be reinforced nylon such as but not limited to a glass component and the like.

The plate portion 76 is generally planar and the lip 60 of the cover portion 40 seals against the plate portion 76. The engagement portion 74 defines the second opening 50. In one embodiment, the engagement portion 74 includes a first ledge 78 and a second ledge 80 disposed in spaced relationship to the first ledge 78 along the axis 38. The first ledge 78 and the second ledge 80 define a slot therebetween. A collar 82 of the steering gear 36 is disposed within the slot such that the first and second ledges 78, 80 retain the double wall dome seal 26 to the steering gear 36. Further, trapping the collar 82 between the first and second ledges 78, 80 allows the double wall dome seal 26 to react against the collar 82 of the steering gear 36 when the steering assembly 24, including the double wall dome seal 26, is installed within the vehicle 20 such that the dash panel 22 compresses the collapsible seal 44 into the collapsed position 56 where the lip 60 seals against the plate portion 76 of the base portion 42.

The double wall dome seal 26 is configured to be decoupled from loads which are transmitted during marriage of a powertrain of the vehicle 20, including the steering assembly 24 and double wall dome seal 26, to a vehicle 20 chassis, including the dash panel 22, by eliminating contact between the double wall dome seal's 26 resilient lip 60 and sheet metal of the dash panel 22. This is accomplished by creating multiple seal loading vectors, dead air space, and the inverted complaint lip 60, which are executed in the single double wall dome seal 26.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A double wall dome seal for sealing between a steering gear and a dash panel of a vehicle, the dome seal comprising:
   a cover portion surrounding an axis and configured for sealing against the dash panel;
   wherein the cover portion defines a first opening;
   a collapsible seal operatively extending from the cover portion and surrounding the axis;
   a base portion operatively extending from the collapsible seal and surrounding the axis such that the collapsible seal is axially disposed between the cover portion and the base portion;
   wherein the base portion is configured for sealing against the steering gear and defines a second opening;
   wherein the collapsible seal defines a cavity which opens between the first opening and the second opening such that the axis extends through each of the first opening, the cavity, and the second opening;
   wherein the collapsible seal is configured to deform along the axis between an extended position and a collapsed position;
   wherein the cover portion is in spaced relationship to the base portion when the collapsible seal is in the extended position; and
   wherein the cover portion is in sealing contact with the base portion when the collapsible seal is in the collapsed position.

2. The double wall dome seal of claim 1, wherein the cover portion includes:
   a rim defining the first opening;
   a lip configured for sealing against the base portion when the collapsible seal is in the collapsed position; and
   a first wall interconnecting the rim and the lip;
   wherein the first wall and the lip radially surround all of the collapsible seal when the collapsible seal is in the collapsed position such that the rim, the lip, the first wall, the collapsible seal, and the base portion cooperate to define a sealing chamber therebetween.

3. The double wall dome seal of claim 2, wherein the cover portion includes a resilient member.

4. The double wall dome seal of claim 3, wherein the first wall extends from the rim at an angle which is obtuse.

5. The double wall dome seal of claim 4, wherein the angle is greater when the lip of the cover portion seals against the plate of the base portion than when the lip of the cover is in spaced relationship to the plate of the base portion.

6. The double wall dome seal of claim 2, wherein the collapsible seal includes a second wall surrounding the axis;
wherein second wall is in abutting relationship to the rim and the base portion.

7. The double wall dome seal of claim 6, wherein the second wall includes a plurality of inner annular rims and a plurality of outer annular rims surrounding the axis;
wherein the inner annular rims and the outer annular rims are disposed in alternating relationship to one another along the axis such that the collapsible seal is undulated.

8. The double wall dome seal of claim 1, wherein the collapsible seal is generally accordion shaped.

9. The double wall dome seal of claim 2, wherein the base portion includes a plate defining the second opening;
wherein the lip is configured for sealing against the plate when the collapsible seal is in the collapsed position.

10. The double wall dome seal of claim 9, wherein the base portion includes an engagement portion defining the second opening and configured for engaging the steering gear.

11. The double wall dome seal of claim 10, wherein the engagement portion includes a first ledge and a second ledge disposed in spaced relationship to the first ledge along the axis;
wherein the first ledge and the second ledge define a slot therebetween; and
wherein the slot is configured for engaging the steering gear.

12. A vehicle comprising:
a dash panel defining a through hole;
a steering gear including a steering shaft and a steering collar surrounding the steering shaft;
wherein the steering shaft and the steering collar extend along an axis; and
a double wall dome seal disposed in sealing engagement between the dash panel and the steering gear, the double wall dome seal including:
a cover portion surrounding the axis and sealing against the dash panel;
wherein the cover portion defines a first opening;
a collapsible seal operatively extending from the cover portion and surrounding the axis;
a base portion operatively extending from the collapsible seal and surrounding the steering shaft such that the collapsible seal is axially disposed between the cover portion and the base portion;
wherein the base portion defines a second opening and seals against the steering gear;
wherein the collapsible seal defines a cavity which opens between the first opening and the second opening such that the steering shaft extends through each of the first opening, the cavity, and the second opening;
wherein the collapsible seal is configured to deform along the axis between an extended position and a collapsed position; and
wherein the cover portion is in sealing contact with the base portion when the collapsible seal is in the collapsed position.

13. The double wall dome seal of claim 12, wherein the cover portion includes:
a rim defining the first opening;
a lip configured for sealing against the base portion when the collapsible seal is in the collapsed position; and
a first wall interconnecting the rim and the lip;
wherein the first wall and the lip radially surround all of the collapsible seal when the collapsible seal is in the collapsed position such that the rim, the lip, the first wall, the collapsible seal, and the base portion cooperate to define a sealing chamber therebetween.

14. The double wall dome seal of claim 13, wherein the first wall extends from the rim at an angle which is obtuse.

15. The double wall dome seal of claim 14, wherein the angle is greater when the lip of the cover portion seals against the plate of the base portion than when the lip of the cover is in spaced relationship to the plate of the base portion.

16. The double wall dome seal of claim 13, wherein the collapsible seal includes a second wall surrounding the axis;
wherein the second wall is in abutting relationship to the rim and the base portion.

17. The double wall dome seal of claim 16, wherein the collapsible seal includes a plurality of inner annular rims and a plurality of outer annular rims surrounding the axis;
wherein the inner annular rims and the outer annular rims are disposed in alternating relationship to one another along the axis such that the collapsible seal is undulated.

18. The double wall dome seal of claim 12, wherein the base portion includes a plate portion defining the second opening;
wherein the lip is configured for sealing against the plate portion when the collapsible seal is in the collapsed position.

19. The double wall dome seal of claim 18, wherein the base portion includes an engagement portion defining the second opening and configured for engaging the steering gear.

20. The double wall dome seal of claim 19, wherein the engagement portion includes a first ledge and a second ledge disposed in spaced relationship to the first ledge along the axis;
wherein the first ledge and the second ledge define a slot therebetween; and
wherein the slot is configured for engaging the steering gear.

* * * * *